Figure 3:
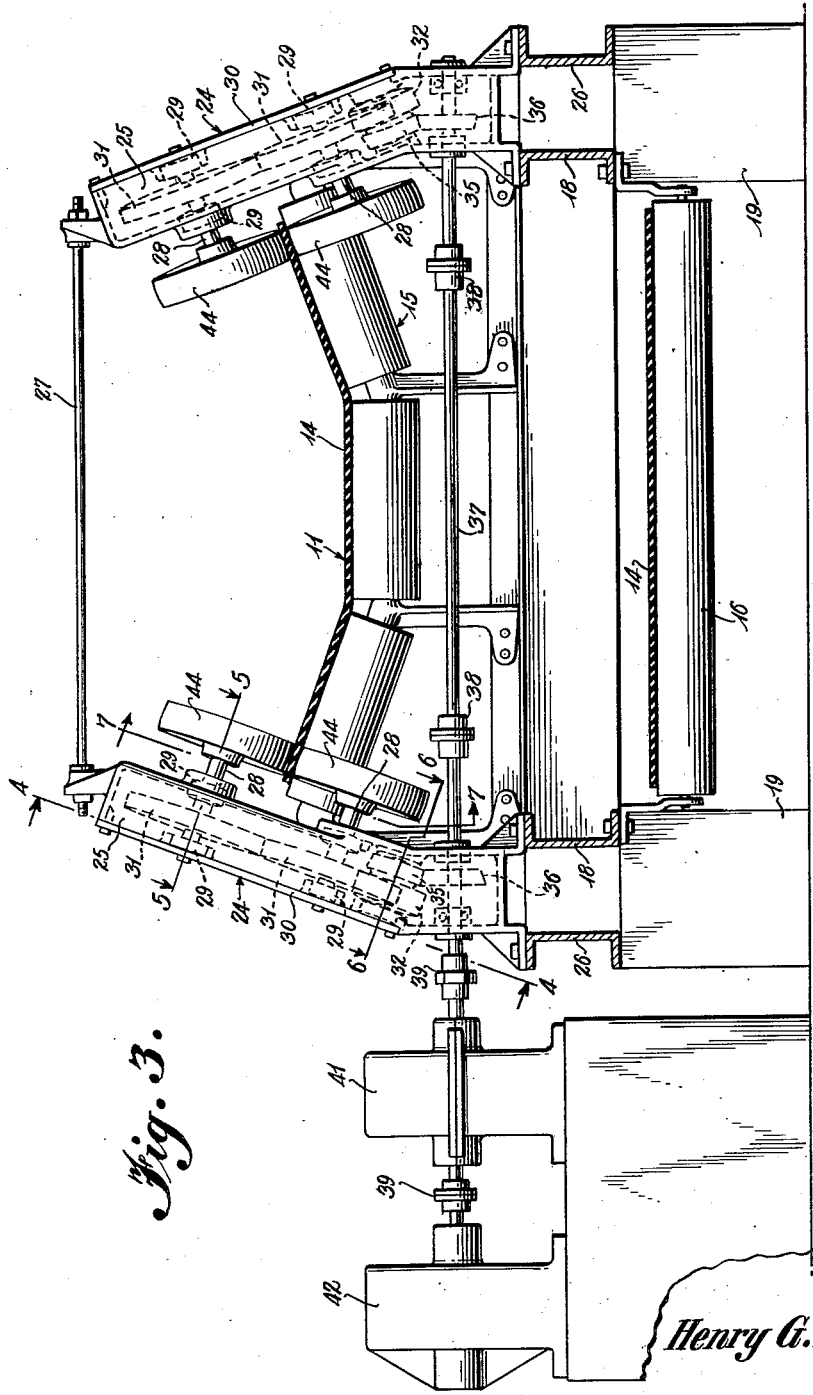

Aug. 21, 1956  H. G. KELLER  2,759,596
BELT CONVEYOR
Filed Nov. 5, 1951  4 Sheets-Sheet 1
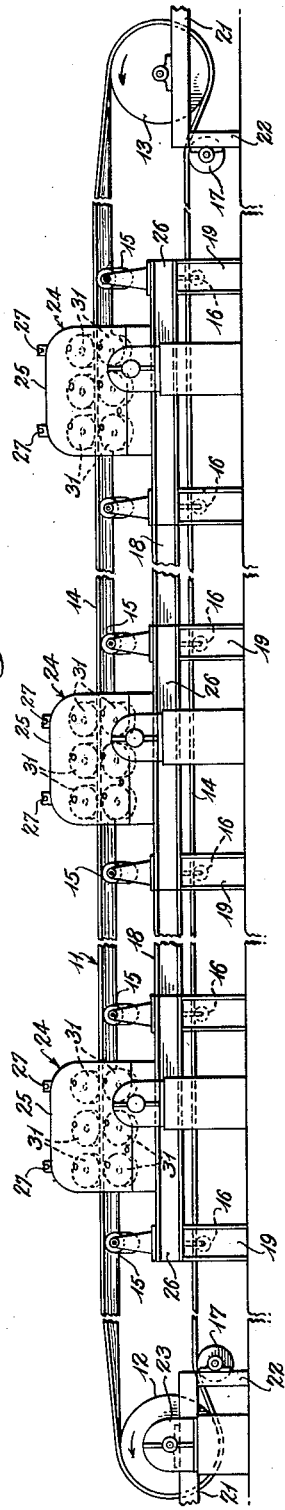
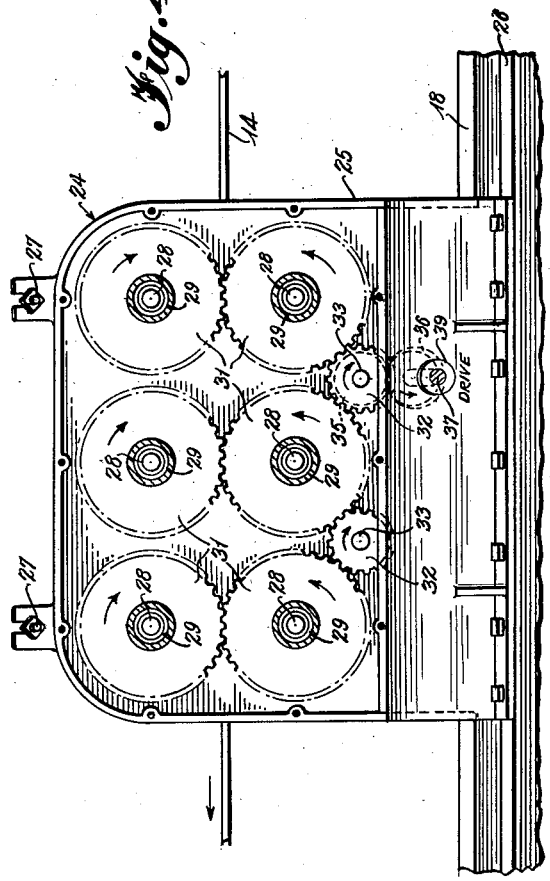
INVENTOR
*Henry G. Keller*
BY
ATTORNEY

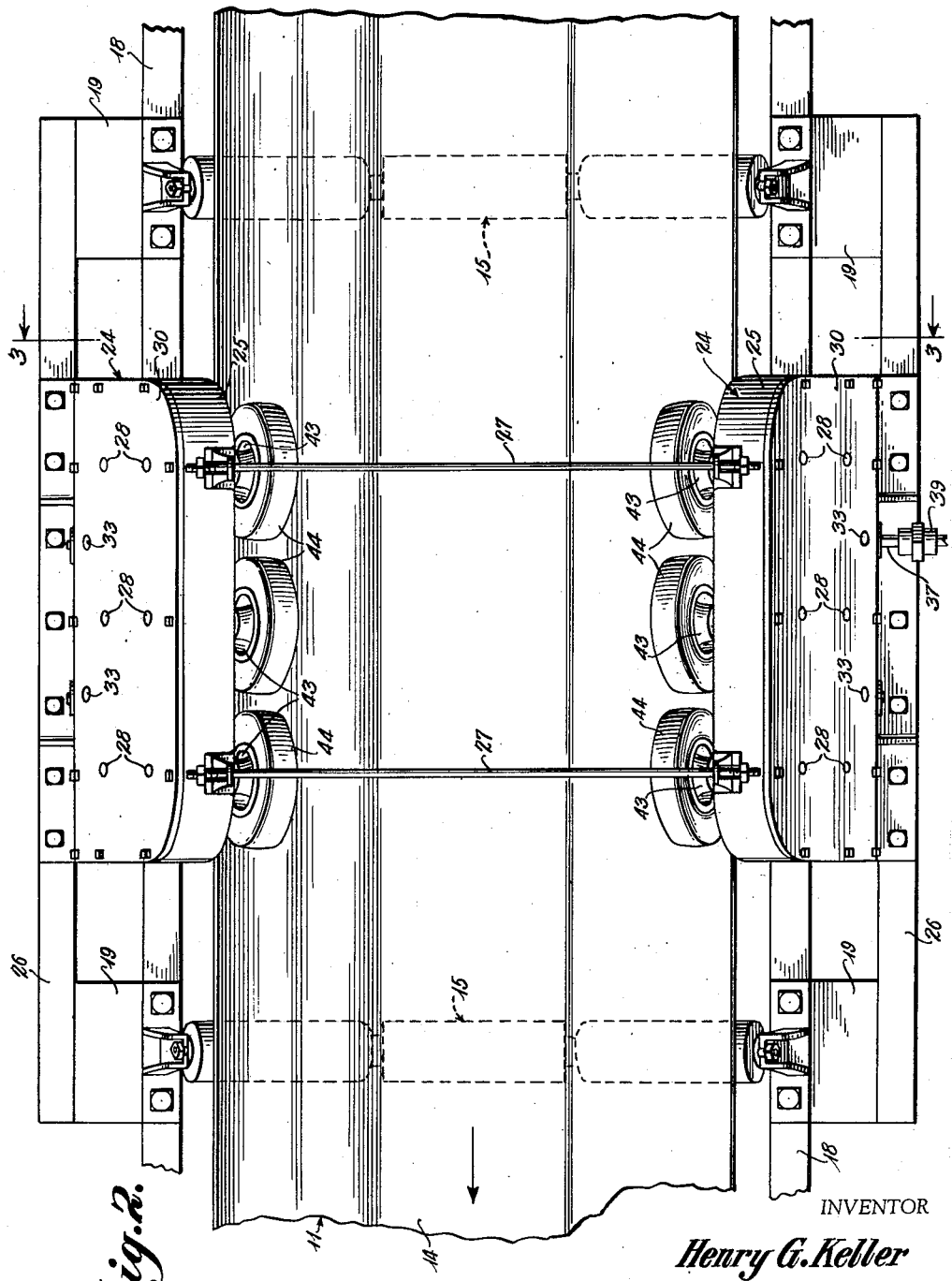

Aug. 21, 1956    H. G. KELLER    2,759,596
BELT CONVEYOR

Filed Nov. 5, 1951    4 Sheets-Sheet 3

INVENTOR
Henry G. Keller
BY
ATTORNEY

Aug. 21, 1956

H. G. KELLER 2,759,596

BELT CONVEYOR

Filed Nov. 5, 1951

4 Sheets-Sheet 4

INVENTOR
Henry G. Keller

BY

ATTORNEY

United States Patent Office 2,759,596
Patented Aug. 21, 1956

2,759,596

BELT CONVEYOR

Henry G. Keller, Glenside, Pa., assignor to Link-Belt Company, a corporation of Illinois Application November 5, 1951, Serial No. 254,851

18 Claims. (Cl. 198—192)

This invention relates to new and useful improvements in belt conveyors and deals more specifically with belt gripping driving units for such conveyors.

The possibility of using a continuous or single conveyor belt for the transportation of coal, ore and like materials over distances of several miles has attracted widespread attention in recent years. Probably the greatest difficulty that must be overcome in developing a belt conveyor for such use stems from the need for a satisfactory type of drive which is capable of applying the required power to the belt at a plurality of points intermediate its terminal pulleys to thereby reduce the tension forces which must be applied to any given increment of the belt. For example, the use of a conventional terminal pulley type of drive requires that the entire tension force necessary to operate the conveyor must be applied to a single portion of the belt. It readily will be apparent that if the conveyor belt were driven at a plurality of points along its length, each drive unit would need to apply only those tension forces necessary to drive that portion of the conveyor belt that is located between a given drive unit and the next preceding drive unit in the conveyor path. In this connection, it will be noted that one important factor which should be considered in designing such an intermediate drive unit is the desirability of adapting the unit for use with standard commercial conveyor belts.

The primary object of this invention is to provide an endless belt conveyor that is driven by a plurality of belt gripping units which are located at spaced intervals along a desired run of the belt and with each unit adapted to apply a given portion of the total force necessary to drive the conveyor.

Another object of the invention is to provide an endless belt conveyor having a plurality of intermediate drive units spaced along its length with each unit independently gripping opposite edge portions of the belt to apply the required driving force thereto.

A still further object of the invention is to provide a belt conveyor drive unit which may be employed to drive a standard commercial conveyor belt at any desired location between its terminal pulleys by pressure engagement with the opposite edge portions of the belt.

A more specific object of the invention is to provide a belt conveyor drive unit having power applying frictional engagement with opposite edge portions of the belt through pneumatically cushioned drive wheels arranged in vertically opposed pairs for receiving the edge portions of the belt therebetween.

Other objects and advantages of the invention will be apparent during the course of the following description.

Figure 5:
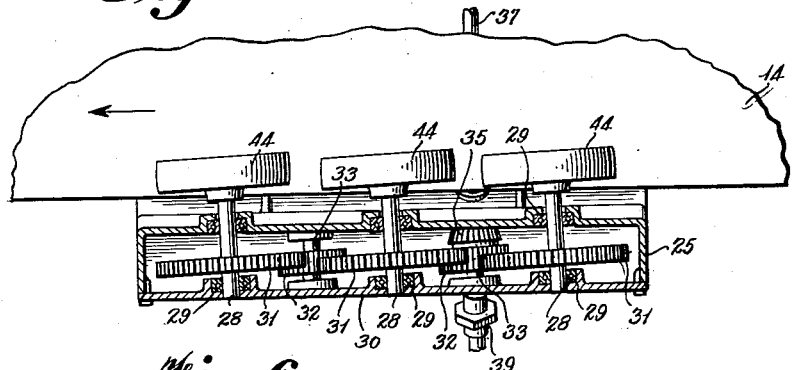
Figure 6:
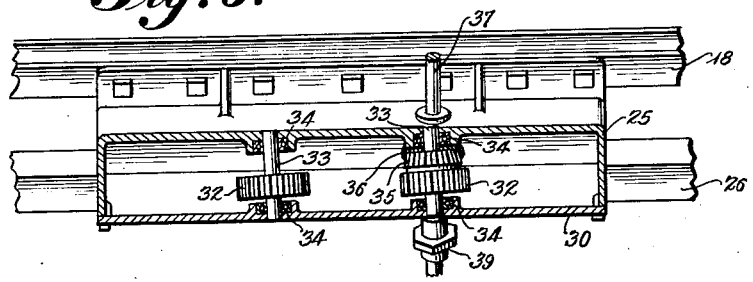
Figure 7:
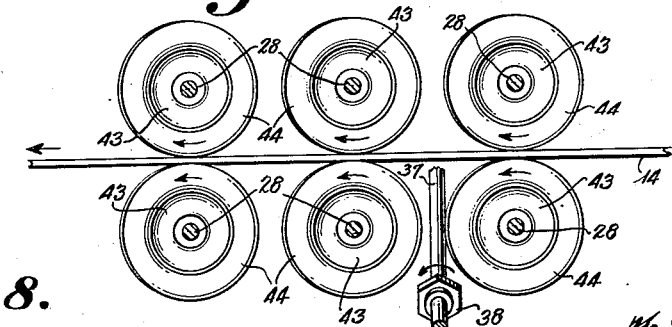
Figure 8:
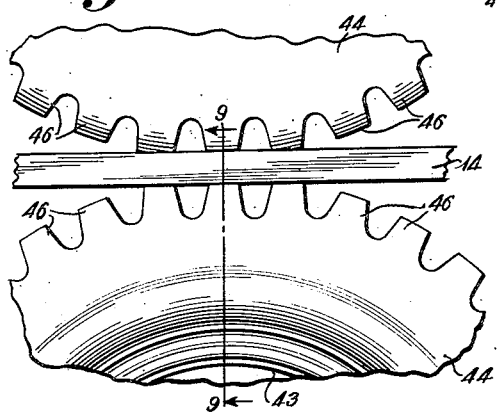
Figure 9:

In the accompanying drawings forming a part of this specification and in which like reference characters are employed to designate like parts throughout the same, Figure 1 is a side elevational view, partly broken away, of a belt conveyor embodying the invention, Figure 2 is an enlarged top plan view of one of the conveyor drive units illustrated in Fig. 1, Figure 3 is a vertical sectional view taken on line 3—3 of Fig. 2, Figure 4 is a sectional view taken on line 4—4 of Fig. 3, Figure 5 is a sectional view taken on line 5—5 of Fig. 3, Figure 6 is a sectional view taken on line 6—6 of Fig. 3, Figure 7 is a sectional view taken on line 7—7 of Fig. 3, Figure 8 is a fragmentary side elevational view showing the engagement of a pair of vertically opposed drive wheels with the conveyor belt, and Figure 9 is a vertical sectional view taken on line 9—9 of Fig. 8.

In the drawings, wherein for the purpose of illustration is shown the preferred embodiment of this invention, and first particularly referring to Fig. 1, reference character 11 designates a belt conveyor which includes a terminal pulley 12 at the head end of the conveyor, a terminal pulley 13 at the tail end of the conveyor, and a standard commercial endless conveyor belt 14 having an active run and a return run extending between the terminal pulleys. The active run of the belt 14 is supported by a plurality of troughing idlers 15 and the inactive or return run of the belt is supported by a plurality of flat idlers 16. Adjacent each of the terminal pulleys 12 and 13, snubbing pulleys 17 engage the belt 14 to increase the contact areas between the belt and the terminal pulleys. The idlers 15 and 16 are mounted in a conventional manner on longitudinal channel beams 18 which are supported by vertical posts 19 on opposite sides of the conveyor 11. The terminal pulleys 12 and 13 are suitably mounted on longitudinal beams 21 supported by vertical posts 22 and the snubbing pulleys 17 are mounted directly on the posts 22.

The terminal pulley 12 at the head end of the conveyor 11 is driven by a motor 23 to apply a driving force to the belt 14 and additional driving forces are applied to the active run of the belt by intermediate or booster drive units 24 which are positioned at longitudinally spaced intervals along the conveyor.

It will be appreciated that the number of drive units 24 employed in a given conveyor installation will vary in accordance with the length of the conveyor. The spacing between adjacent drive units 24 will vary in accordance with the maximum permissible value of the tension forces that may be applied to the belt 14. Generally speaking, the tension forces in a conveyor belt increase from the lowest value immediately beyond one point of application of a driving force to the maximum value immediately preceding the next succeeding point of application. The rate of increase of the tension forces in the belt depends primarily upon the weight of the belt and the material being conveyed and the angle of inclination of the conveyor, if any. In view of these general facts, the intermediate drive units 24 should be so positioned along the length of the belt 14 that the tension forces at any given location will not exceed their maximum permissible value.

Referring now to Figs. 2 to 5, inclusive, for a detail description of one of the several identical drive units 24, it will be noted that the troughing idlers 15 support the opposite marginal portions of the active run of the belt 14 in upwardly inclined positions. On opposite sides of the conveyor 11 and adjacent its inclined portions are positioned the separate gear housings 25 with each housing being arranged in normal relationship with its adjacent portion of the belt. Each housing 25 is mounted on its adjacent channel beam 18 and on a second channel beam 26, arranged in back-to-back relationship. Lateral support is provided for the housings 25 by tie rods 27 which extend transversely between and are connected to the upper portions of the housings. The tie rods 27 are located a sufficient distance above the belt 14 to provide clearance for passage of the material that is transported by the conveyor 11.

Each of the housings 25 is provided with a plurality of shafts 28 which are rotatably supported by bearings 29 mounted on the walls of the housings, as is best illustrated in Fig. 5. In this connection it will be noted that the outer wall of each housing 25 is formed of a removable cover plate 30. All of the shafts 28 of each housing 25 are arranged in parallel relationship with each other and with the plane of the adjacent inclined portion of the belt 14. Further, the shafts 28 are arranged in vertically opposed pairs with each pair having the corresponding end portions of its shafts extending inwardly from its housing 25 to equally spaced positions above and below the inclined adjacent portion of the belt 14. As illustrated in Fig. 5, the axis of each shaft 28 is arranged at an angle that is slightly less than 90° relative to the center line of the belt 14 on the approach side of the drive unit, for a reason that later will be described.

Rigidly mounted on each shaft 28 within its housing 25 is a gear 31 that meshes with the gear 31 of its vertically opposed shaft, as illustrated in Fig. 4. The lower ones of adjacent pairs of meshing gears 31 are drivingly connected by pinions 32 so that all of the gears are locked together for simultaneous rotation. The pinions 32 are rigidly connected to shafts 33 which are rotatably supported by bearings 34 mounted in the walls of the housing 25. The shafts 28 and 33 of each housing are arranged in parallel relationship and each pinion 32 is wide enough to cause its teeth to properly mesh with the teeth of the two gears 31 that are interconnected thereby, as is best illustrated in Fig. 5.

A bevel pinion 35 is mounted on one of the shafts 33 adjacent its pinion 32 and meshes with the adjacent bevel gear 36 mounted on the sectional drive shaft 37 which extends between and is supported by the housings 25 on opposite sides of the conveyor 11. The several sections of the drive shaft 37 are connected by the couplings 38 to compensate for any misalinement. One end of the shaft 37 is connected by couplings 39 and a speed reducer 41 to a motor 42 for driving the entire gear set.

Rigidly mounted on the inwardly extending end portion of each of the shafts 28 is a wheel 43 having a pneumatic tire 44 and tube 45 mounted thereon. The peripheral surface or tread of each tire 44 is formed with a plurality of knob like projections 46 to engage the belt 14. The treads of the tires 44 on each vertically opposed pair of shafts 28 will, therefore, engage the opposite surfaces of the belt 14 to grip its adjacent edge portion under the desired pneumatic tire pressure. The slightly off-set position of the shafts 28 relative to the center line of the belt will cause the tires 44 to be toed or skewed outwardly to apply a slight lateral tension to the opposite edges of the belt 14 to prevent crowding toward the center as the belt passes through the drive unit 24.

The operation of one of the several identical drive units 24 now will be explained.

When the motor 42 is actuated to rotate the drive shaft 37, all of the gears 31 of the two opposed housings 25 will be set in motion to rotate their associated wheels 43. The wheels 43 above and below the belt, of course, will be rotated in opposite directions so that the belt, which is gripped between vertically opposed pairs of tires 44, will have a driving force applied thereto. The gripping of the belt 14 by the knobby projections 46 on the tires 44 will permit small particles of dirt or other material to pass between the tires and belt without damage to either of these members. It will be apparent that the number of pairs of vertically opposed wheels 43 on opposite sides of the conveyor 11 may be varied to increase or decrease the length of the section of the belt 14 to which driving forces are to be applied by a drive unit 24. Further, the release of the compressed air from the tubes 45 of vertically opposed pairs of tires 44 will cause the tires to release their gripping engagement with the belt 14 so that the wheels 43 easily may be removed or replaced.

It is to be understood that the form of the invention herewith shown and described is to be taken as the preferred example of the same, and that various changes in the shape, size, and arrangement of parts may be resorted to without departing from the spirit of the invention or the scope of the subjoined claims.

Having thus described the invention, I claim:

1. A belt conveyor, comprising an endless flexible conveying belt, means for supporting said belt for movement through a closed path with opposite edge portions of the belt inclined laterally upwardly through a part of the path, and a drive unit formed of a pair of pneumatic tired drive wheels associated with each edge portion of the belt in the part of said path where the edge portions are laterally upwardly inclined, each of said pairs of drive wheels having parallel axes of rotation and being arranged in normal relationship with the associated, inclined belt edge portion to provide opposed traveling treads for engaging opposite surfaces of the associated belt edge portion, and means for rotating said drive wheels to cause their traveling treads to drive the belt.

2. A belt conveyor, comprising an endless flexible conveying belt, means for supporting said belt for movement through a closed path with opposite edge portions of the belt inclined laterally upwardly through a part of the path, and a drive unit formed of a plurality of pairs of pneumatic tired drive wheels associated with each edge portion of the belt in the part of said path where the edge portions are laterally upwardly inclined, each of said pairs of drive wheels having parallel axes of rotation and being arranged in normal relationship with the associated, inclined belt edge portion to provide opposite traveling treads for engaging opposite surfaces of the associated belt edge portion, and means for rotating said drive wheels to cause their traveling treads to drive the belt.

3. A belt conveyor, comprising an endless flexible conveying belt, means for supporting said belt with opposite edge portions of the belt inclined laterally upwardly through a portion of the belt length, and a plurality of drive units spaced longitudinally of said conveyor, each of said drive units comprising a plurality of pairs of pneumatic tired drive wheels associated with each inclined edge portion of the belt, each of said pairs of drive wheels having axes of rotation and arranged in normal relationship with the associated belt edge portion to provide opposed traveling treads engaging opposite surfaces of the belt edge portion, and means for rotating said drive wheels to cause their traveling treads to drive the belt.

4. A belt conveyor, comprising an endless flexible conveying belt, means for supporting said belt with opposite edge portions of the belt inclined laterally upwardly through a portion of the belt length, and a drive unit formed of a plurality of rotatable shafts mounted in spaced relationship above and below the inclined edge portions of the belt, a pneumatic tired drive wheel mounted on each of said shafts for rotation therewith in normal relationship with the associated, inclined belt edge portion, each of said drive wheels providing a traveling tread tangentially engaging the surface of its adjacent belt edge opposite another of said drive wheel treads, and a prime mover for rotating all of said shafts to cause the traveling treads of the drive wheels mounted thereon to drive the belt.

5. A belt conveyor, comprising an endless flexible conveying belt, terminal pulleys for the belt, idlers supporting said belt between the terminal pulleys for movement through an active run and a return run with the active run of said belt having its longitudinal marginal portions inclined laterally upwardly, and a drive unit formed of a plurality of rotatable shafts mounted in spaced parallel relationship above and below the edges of the inclined marginal portions of the belt, a pneumatic tired drive wheel mounted on each of said shafts for rotation therewith, each of said drive wheels providing a traveling tread engaging the inclined surface of its adjacent belt edge opposite another of said drive wheel treads, and a prime mover for rotating all of said shafts to cause the traveling treads of the drive wheels mounted thereon to drive the belt.

6. A belt conveyor, comprising an endless flexible conveying belt, terminal pulleys for the belt, idlers supporting said belt between the terminal pulleys for movement through an active run and a return run with the active run of said belt having its longitudinal marginal portions inclined laterally upwardly, and a plurality of drive units spaced longitudinally of said conveyor between said terminal pulleys, each of said drive units comprising a plurality of rotatable shafts mounted in spaced parallel relationship above and below the edges of the inclined marginal portions of the belt and arranged in vertically opposed pairs, gear means positively connecting the vertically opposed pairs of shafts for simultaneous rotation in opposite directions, a pneumatic tired drive wheel mounted on each of said shafts for rotation therewith, each of said drive wheels providing a traveling tread engaging the inclined surface of its adjacent belt edge opposite another of said drive wheel treads, and a prime mover for driving said gear means to rotate said shafts and to cause the traveling treads of the drive wheels mounted thereon to drive the belt.

7. A belt conveyor, comprising an endless flexible conveying belt, terminal pulleys for the belt, idlers supporting said belt between the terminal pulleys for movement through an active run and a return run with the active run of said belt having its longitudinal marginal portions inclined laterally upwardly, and a drive unit formed of a plurality of rotatable shafts mounted in spaced parallel relationship above and below the edges of the inclined marginal portions of the belt, each of said shafts having its axis arranged at slightly less than a right angle relative to the centerline of the belt as it approaches the drive unit, a pneumatic tired drive wheel mounted on each of said shafts for rotation therewith, each of said drive wheels providing a traveling tread engaging the inclined surface of its adjacent belt edge opposite another of said drive wheel treads, and a prime mover for rotating all of said shafts to cause the traveling treads of the drive wheels mounted thereon to drive the belt.

8. A belt conveyor, comprising an endless flexible conveying belt, terminal pulleys for the belt, idlers supporting the belt between the terminal pulleys for movement through a troughed active-run and a flat return-run, and a drive unit for simultaneously driving at the same linear speed transversely aligned inclined edge portions of the troughed active-run of the belt, said drive unit comprising a pair of pneumatically cushioned driving wheels providing peripherally opposed traveling treads engaging opposite surfaces of each inclined edge portion of the belt, means for drivingly interconnecting the two opposed wheels of each pair so they will rotate at the same speed but in opposite directions, means for drivingly interconnecting the two pairs of wheels so they will rotate at the same speed, and a prime mover for driving the last mentioned means.

9. A belt conveyor as defined in claim 8 further characterized by the driving wheels of each pair lying in a common plane that is normal to the plane of the associated inclined edge portion of the belt.

10. A belt conveyor as defined in claim 9 further characterized by the said common plane of each pair of wheels toeing slightly outwardly relative to the center line of the belt in the direction of travel of the latter.

11. A belt conveyor as defined in claim 8 further characterized by the drive unit including a plurality of pairs of pneumatically cushioned driving wheels providing peripherally opposed traveling treads engaging opposite surfaces of each inclined edge portion of the belt, and gearing means for drivingly interconnecting all of the wheels associated with each one of the inclined edge portions of the belt so they will rotate at the same speed.

12. A belt conveyor as defined in claim 11 further characterized by a drive shaft extending transversely of the belt, gearing means drivingly interconnecting the shaft and the gearing means for the wheels for both of the inclined edge portions of the belt so that all of the wheels will rotate at the same speed, and a prime mover for driving said shaft.

13. A belt conveyor, comprising an endless flexible conveying belt, terminal pulleys for the belt, idlers supporting said belt between the terminal pulleys for movement through a troughed active run and a flat return-run, and a plurality of driving units spaced longitudinally of said belt, each one of said driving units simultaneously driving at the same linear speed transversely aligned inclined edge portions of the troughed active run of the belt, each drive unit including a pair of pneumatically cushioned drive wheels having their treads engaging opposite surfaces of said inclined edge portion of the belt, means for drivingly interconnecting all of the wheels of both pairs so that they will rotate at the same speed and with the two wheels of each pair rotating in opposite directions, and a prime mover for driving all of the wheels through said interconnecting means.

14. A belt conveyor as defined in claim 13 further characterized by each drive unit including a plurality of pairs of rubber tired wheels having their treads engaging opposite surfaces of each inclined edge portion of the belt, and gearing means for drivingly interconnecting all of the wheels associated with each one of the inclined edge portions of the belt so they will rotate at the same speed.

15. A belt conveyor as defined in claim 14 further characterized by a drive shaft extending transversely of the belt at the location of each drive unit, gearing means drivingly connecting each shaft to the said gearing means for the wheels of its drive unit so that all of the wheels of the said unit will rotate at the same speed, and a separate prime mover for driving each one of said drive shafts.

16. A belt conveyor, comprising an endless flexible conveying belt, terminal pulleys for the belt, idlers supporting said belt between the terminal pulleys for movement through a troughed active-run and a flat return-run, and a drive unit for simultaneously driving at the same linear speed transversely aligned inclined edge portions of the troughed active-run of the belt, said drive unit including separate gear housings positioned at opposite sides of and in normal relation to the inclined edge portions of the troughed active-run of the belt, a plurality of shafts journaled in each gear housing and projecting therefrom in spaced relationship above and below the adjacent edge portion of the belt, means in each gear housing for drivingly interconnecting the shafts journaled therein for simultaneously rotating at the same speed all of said shafts but with the said shafts above and below the belt edge rotating in opposite directions, a drive wheel mounted on the projecting portion of each of said shafts with the treads of the wheels drivingly engaging the belt edge, means for drivingly interconnecting the shafts journaled in the two gear housings for rotation at the same speed, and a prime mover for driving the last mentioned means.

17. A belt conveyor as defined in claim 16 further characterized by the means in each gear housing for drivingly interconnecting the shafts comprising gears mounted on the shafts with the gears of the shafts below the belt edge meshing with the gears of the shafts above the belt edge to form pairs, and pinions for interconnecting the aforesaid pairs of meshing gears.

18. A belt conveyor as defined in claim 17 further characterized by the means for drivingly interconnecting the shafts journaled in the two gear housings comprising a drive shaft extending transversely of the belt and entering both gear housings, and gearing in each housing for drivingly interconnecting the drive shaft with the gears that drivingly interconnect the wheel shafts.

(References on following page)

References Cited in the file of this patent

UNITED STATES PATENTS

| | | |
|---|---|---|
| 1,823,483 | Bausman | Sept. 15, 1931 |
| 1,928,117 | Stewart | Sept. 26, 1933 |
| 2,525,590 | Collins | Oct. 10, 1950 |
| 2,553,964 | Eggleston | May 22, 1951 |

FOREIGN PATENTS

| | | |
|---|---|---|
| 609,235 | Great Britain | Sept. 28, 1948 |